US005816592A

United States Patent [19]
Horton, II et al.

[11] Patent Number: 5,816,592
[45] Date of Patent: Oct. 6, 1998

[54] YOUTH SCOOTER

[75] Inventors: Edward N. Horton, II, Rossville, Ga.;
Franz Reichert, Chattanooga, Tenn.

[73] Assignee: Rad Enterprises, L.L.C., Chattanooga, Tenn.

[21] Appl. No.: 600,805

[22] Filed: Feb. 13, 1996

[51] Int. Cl.⁶ ................................................ B62M 1/00
[52] U.S. Cl. .................... 280/87.041; 280/87.05
[58] Field of Search ............................ 280/87.042, 603, 280/87.041, 47.34, 87.05, 87.021

[56] References Cited

U.S. PATENT DOCUMENTS

| D. 120,019 | 4/1940 | Rodriguez . | |
|---|---|---|---|
| D. 187,706 | 4/1960 | Jenkins | D34/15 |
| D. 199,682 | 12/1964 | Jezowski | D34/15 |
| 2,545,209 | 3/1951 | Meehan | 280/603 |
| 3,565,454 | 2/1971 | Stevenson . | |
| 3,795,409 | 3/1974 | Cudmore . | |
| 4,029,330 | 6/1977 | Runyan, Jr. . | |
| 4,060,253 | 11/1977 | Oldendorf . | |
| 4,082,306 | 4/1978 | Sheldon . | |
| 4,089,536 | 5/1978 | Larrucea . | |
| 4,133,548 | 1/1979 | Smith . | |
| 4,337,963 | 7/1982 | Stevenson . | |
| 4,460,187 | 7/1984 | Shimuzi | 280/11.1 |
| 4,505,477 | 3/1985 | Wilkinson . | |
| 4,807,896 | 2/1989 | Philippi | 280/243 |
| 5,090,716 | 2/1992 | Borden | 280/87.042 |
| 5,360,222 | 11/1994 | Bro et al. | 280/87.021 |
| 5,417,444 | 5/1995 | Chen | 280/87.042 |
| 5,547,204 | 8/1996 | Gamzo | 280/11.19 |

FOREIGN PATENT DOCUMENTS

| 2416-027 | 10/1979 | France . | |
|---|---|---|---|
| 2733093 A1 | 2/1979 | Germany | A63C 17/04 |
| 3442 193A | 11/1985 | Germany | B62M 1/00 |
| 2163659 | 3/1986 | United Kingdom | A63C 17/26 |

OTHER PUBLICATIONS

U.S. application No. 08/383,068, Horton, et al., filed Feb. 3, 1995.
Skateboarder Magazine, vol. 4, No. 8 (Mar. 1978), pp. 138–139.
Smith–Horton Enterprises, Inc. brochure, 1995.

Primary Examiner—J. J. Swann
Assistant Examiner—Avraham Lerner
Attorney, Agent, or Firm—Baker, Donelson, Bearman & Caldwell

[57] ABSTRACT

A multi-planed scooter for imaginative riding play having a deeply concave riding platform molded of lightweight polypropylene plastic or like material. The riding platform is formed by joining three sections having wide riding surfaces with tongue and groove assembly. Terminal riding surfaces include molded handle and decelerator portions. All riding surface sections have structural reinforcement channels and molded wheel assembly portions that cover the axle and minimize the risk of injury to very young riders' fingers. The youth scooter is smaller in length than higher-performance multi-planed scooters and has wheels that are lighter, larger in diameter, and wider than wheels generally used on higher-performance skateboards and scooters.

1 Claim, 2 Drawing Sheets

YOUTH SCOOTER

TECHNICAL FIELD

This invention relates generally to scooters, and more particularly concerns an improved multi-planed youth scooter for imaginative riding play, the characteristics of which result in an age and skill appropriate riding toy for very young children.

BACKGROUND OF THE INVENTION

Scooters and skateboards are common and configured in many different designs based primarily on the use of a single horizontal riding platform with a plurality of wheels thereunder. Examples of scooters may be found in U.S. Design Pat. No. 120,019 to Rodriguez and U.S. Design Pat. No. 187,706 to Jenkins. Common skateboards are exemplified by those disclosed in U.S. Pat. No. 4,337,963 to Stevenson, U.S. Pat. No. 4,089,536 to Larrucea, and U.S. Pat. No. 3,565,454 to Stevenson.

Multi-planed scooters are exemplified by the prior art contributed by applicant. U.S. Pat. No. 4,133,548 to Smith describes a scooter for performing riding tricks, consisting of a generally concave riding platform with interior and exterior surfaces, preferably comprising three elongated platform beams connected together at angles, with a holding means attached to at least one end of the platform, and a plurality of roller means attached to the exterior platform surfaces near the junctures of the platform beams. The Smith scooter shifts from one riding position to another when the person riding the scooter shifts the weight of his body while rolling on a riding surface. The Smith scooter, however, was found to be abrupt and inconvenient to maneuver. An improved scooter, disclosed in patent application Ser. No. 08/383,068 was developed to overcome these problems and provide a high-performance scooter with improved riding stability, shock absorption, and deceleration; a choice of turning radii; and ease and adjustability of steering. These scooters, however, are too large, heavy, and difficult to use for very small children. The present invention is directed to overcoming these problems.

SUMMARY OF THE INVENTION

Therefore, it is an object of the present invention to provide an improved multi-planed youth scooter for imaginative riding play which is formed of molded plastic into wide, non-skid riding surfaces for lightness and safe footing for the very young rider.

It is likewise an object of the present invention to provide an improved multi-planed youth scooter that is smaller in size and more deeply concave to better fit the smaller, very young rider.

It is also an object of the present invention to provide an improved wheel assembly which has both lighter, wider, and larger diameter wheels for improved stability for very young riders as well as no exposed areas where the very young rider could injure his or her fingers.

It is another object of the present invention to provide a handle means that has no protruding members to reduce the risk of injury and improve handling by the very young rider.

The foregoing objectives are achieved by an improved multi-planed youth scooter consisting of a special shaped deeply concave riding platform formed by a plurality of lightweight molded riding surfaces, and a plurality of wheel assemblies. The improved scooter has angled single handle portions molded into the end of at least one peripheral riding surface. Each wide riding surface has a textured, non-skid interior surface and an exterior surface having molded structural reinforcement channels. The improved youth scooter also has plurality of wheel assemblies that are mounted to the underside of the riding platform by means of an axle and cap nut system that passes through a molded axle support which conceals the axle. The wheels of the improved youth scooter are large, light, and wide. The improved youth scooter also has at least one decelerator molded into the underside of the riding platform toward the end of one of the peripheral planar riding surfaces. The decelerator provides deceleration for the rider when the relevant riding surface is tilted to engage the decelerator with the ground or cement surface on which the improved youth scooter is being ridden.

Other objects and advantages of the invention will become apparent upon reading the following detailed description and upon reference to the drawings.

DETAILED DESCRIPTION OF THE INVENTION

While the invention will be described in connection with the preferred embodiment, it will be understood that we do not intend to limit the invention to that embodiment. On the contrary, we intend to cover all alternatives, modifications, and equivalences that may be included within the spirit and scope of the invention as defined by the appended claims.

Figure 1:
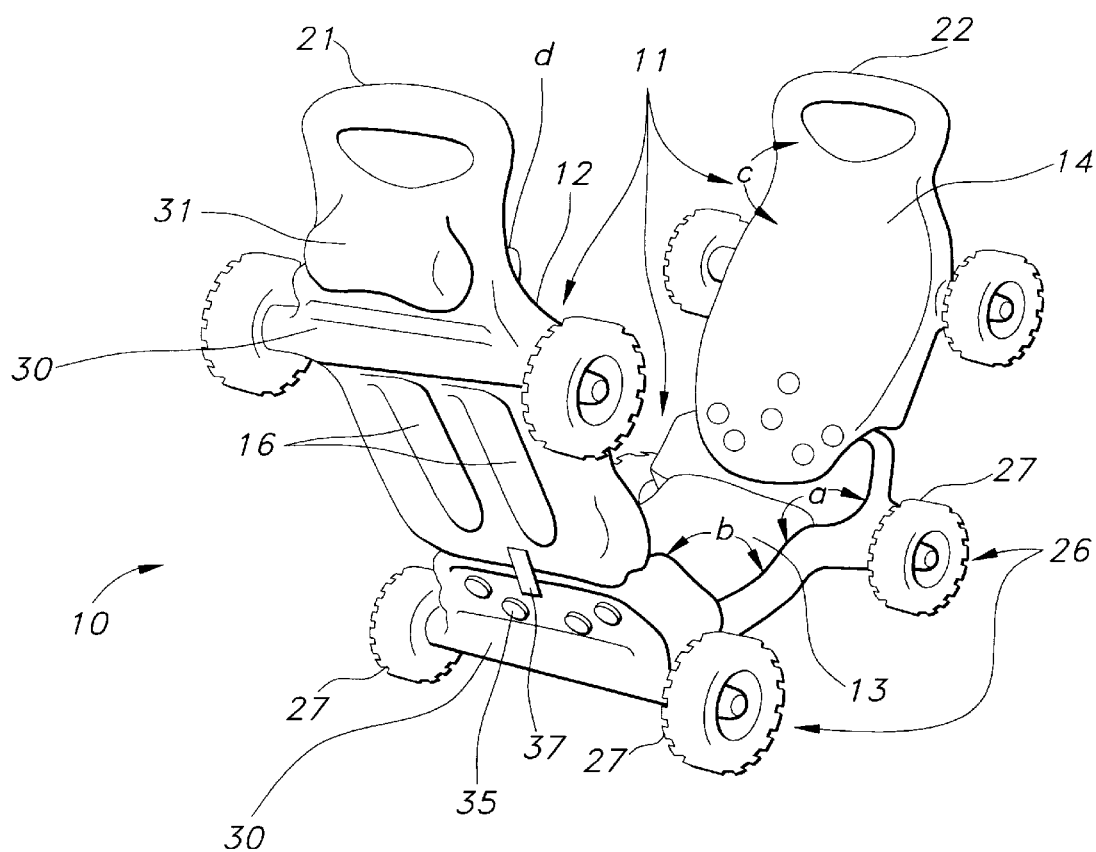
FIG. 1 is a perspective view of the embodiment of the improved multi-planed youth scooter in a standing, sitting, squatting, or lying-down riding position.

Turning to FIG. 1, there is shown an improved multi-planed youth scooter 10 embodying the present invention. Improved youth scooter 10 may be ridden in a number of different ways: as a scooter, by placing one foot on riding surface 12 of the multi-planed riding platform 11; as a "sidewalk bobsled," in the position shown in FIG. 1, by sitting on riding surface 13 with the rider's feet on one of the two other riding surfaces 12 or 14, and the rider's back on the remaining riding surface 12 or 14; as a surfboard, also using the position shown in FIG. 1, by standing on riding surface 13 and holding handle portions 21 and 22 at either end of the scooter 10; and by straddling the scooter 10, with the rider's feet on riding surfaces 12 and 14.

As may be appreciated from FIG. 1, the riding platform 11 consists of riding surfaces 12, 13, and 14. The riding surfaces 12, 13, and 14 are formed of plastic, preferably light weight polypropylene plastic with textured, non-skid surfaces molded into the upper side of riding platform 11 on interior riding surfaces 12, 13, and 14. Graphics may be applied as decals or the like to the interiors and exteriors of riding surfaces 12, 13, and 14. The exteriors of riding surfaces 12, 13, and 14 possess molded structural reinforcement channels 16. The riding platform 11 is formed by a tongue and groove mating of riding surfaces 12, 13, and 14, further secured by fastening means 35, typically a plurality of nut and bolt assemblies that pass through recessed bolt holes 36 (shown in FIG. 2), plus a connector plate 37, preferably formed of metal, secured to riding platform 11 by fastening means (typically, nuts and bolts).

Still referring to FIG. 1, riding surfaces 12, 13, and 14 are wider than the riding surfaces of higher performance scooters and skateboards. Typically, riding surface 14 is 9.75 inches wide at its widest point and 8 inches wide at its terminal edge, whereas the same riding surface on a higher performance multi-planed scooter typically is 8.50 inches wide at its widest point and only 6 inches wide at its terminal end. Similarly, riding surface 13 typically is 9.50 inches wide on improved youth scooter 10, whereas higher performance multi-planed scooters generally are only 8.50 inches wide across the central riding surface. Further, riding surface 12 of the improved youth scooter 10 typically is 9.50 inches wide at its widest point and 7.50 inches wide at its terminal end. The same board on a higher-performance multi-planed scooter generally measures only 8.50 inches wide at its widest point and only 5.75 inches wide at its terminal end.

The riding surfaces 12, 13, and 14 of riding platform 11 are molded and mated to form the configuration shown at an angle a of between 154.5° and 149.5°, preferably 152.5°, between riding surfaces 13 and 14, and at an angle b of between 119.5° and 112.5°, preferably 116°, between riding surfaces 12 and 13. The terminal riding surfaces 12 and 14 of riding platform 11 are also bent to form the handle means 22 at an angle c of between 137° and 177°, preferably 152°, from the plane of the adjacent riding surface 14 and toward the rider. Riding surface 12 is molded at an angle d of between 135° and 175°, preferably 150°, from the plane of the adjacent riding surface 12 and toward the rider to form handle means 21. Handle means 21 and 22 are single, rather than double, handles to eliminate protruding elements and facilitate the very young rider's control of the improved youth scooter 10.

Referring to FIG. 1, it may be appreciated that the degree of angled bend of the handle portions 21 and 22 and of the riding platform 11 is critical to the performance of the improved youth scooter 10 for the balance and safety of the very young rider whose body is generally of much smaller size than that of the rider of a higher-performance scooter or skateboard. In addition, the riding platform itself is scaled down considerably to accommodate the very young rider. Typically, the length of the riding platform, measured from base of handle to base of handle, of the improved youth scooter 10 is 44 inches, whereas that of a higher performance multi-planed scooter may be 54.75 inches. The combination of the shorter, wider riding platform and greater degree of arch significantly improves the youth scooter's performance by providing greater riding security, a better centered riding position, and greater control in steering for the smaller very young rider.

Still referring to FIG. 1, there is shown generally the decelerator 31 of the present invention. As may be appreciated, the decelerator 31 may be and typically is molded into the underside of both riding surfaces 12 and 14.

Figure 2:
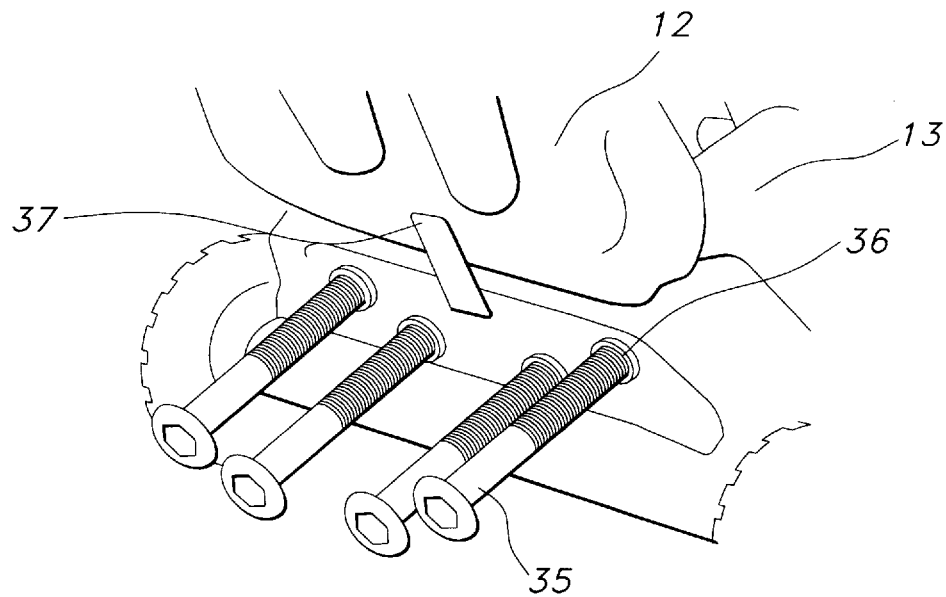
FIG. 2 is a perspective view of a type of fastening means that may be used to secure and stabilize the improved multi-planed youth scooter of this invention.

Referring now to FIG. 2, there is depicted in isolation the underside of riding platform 11 where fastening means 35 are fitted into recessed bolt holes 36 in order to secure the tongue and groove assembly of riding platform 11. In addition, connector plate 37 is fastened to adjacent riding surfaces 12 and 13 by fastening means (not shown) to stabilize the assembly of riding platform 11. Fastening means 35 and connector plate 37 are also shown generally in FIG. 1.

Figure 3:
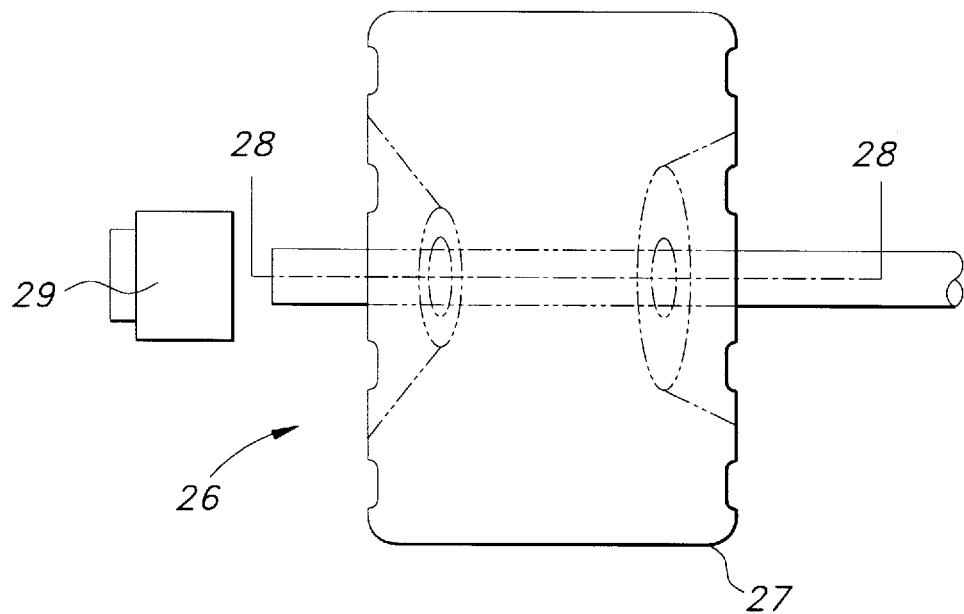
FIG. 3 is a side view of a wheel assembly of the embodiment of the improved multi-planed youth scooter depicted in FIG. 1.

FIG. 3 shows the improved wheel assembly 26 of the present invention. The wheels 27 are formed from plastic, preferably lightweight polypropylene. Wheels 27 typically are 4 inches in diameter and 1.50 inches wide, whereas wheels on higher performance multi-planed scooters generally are made from heavier plastic, generally polyurethane, and are only 2.50 inches in diameter and approximately 1 inch wide in riding surface. Axle 28 and cap nut 29 are fitted through axle support 30 (shown in FIG. 1) and wheel 27 to form wheel assembly 26. Axle support 30 conceals axle 28 to protect little fingers from getting caught in a rotating assembly.

Other aspects, objects, and advantages of this invention can be obtained from a study of the drawings, the disclosure, and the appended claims.

We claim:

1. A multi-planed scooter for use by very young children, which scooter is having a riding platform formed of a plurality of planar surfaces connected with each other's ends at angles and forming interior and exterior platform surfaces, a holding means attached to at least one end of the platform, and a plurality of roller means attached to the exterior platform surfaces comprising:

(a) the riding platform having structural reinforcement channels molded into said exterior platform surfaces and a decelerator molded into at least one of said exterior platform surfaces, the riding platform comprised of a plurality of wide, lightweight, textured, non-skid polypropylene planar surfaces connected at angles with each other's ends by tongue and groove and fastening means wherein the riding platform defines a first plane, a second plane, and a third plane, said riding platform terminating at at least one end in molded single handle portions angled away from and above the plane defined by the riding platform adjacent to said handle, said riding platform being stabilized at each juncture of adjacent riding surfaces by a connector plate fitted into a recessed area on the exterior platform surface and mounted thereto by fastening means; and (b) wheel assemblies comprising wheel and axle assemblies for mounting onto said riding platform through an axle support molded into said exterior platform surfaces.

* * * * *